United States Patent [19]

Paul

[11] 4,111,881

[45] Sep. 5, 1978

[54] POLYOXYHYDROCARBYLENE DIHYDROCARBYL ETHERS AS COALESCING AGENTS FOR SYNTHETIC POLYMER LATEXES

[75] Inventor: George A. Paul, Midland, Mich.

[73] Assignee: The Dow Chemical Company, Midland, Mich.

[21] Appl. No.: 829,688

[22] Filed: Sep. 1, 1977

[51] Int. Cl.$^2$ .................. C09D 3/74; C09D 3/80
[52] U.S. Cl. ................ 260/29.6 E; 260/29.6 ME; 260/29.7 E; 260/33.2 R
[58] Field of Search .............. 260/29.6 E, 29.6 ME, 260/33.2 R, 29.7 E

[56] References Cited

U.S. PATENT DOCUMENTS

| | | | |
|---|---|---|---|
| 2,232,933 | 2/1941 | Wiley et al. | 260/32.2 |
| 2,472,232 | 6/1949 | Schulze et al. | 526/909 |
| 2,838,421 | 6/1958 | Sohl | 428/248 |
| 2,910,448 | 10/1959 | Goldberg et al. | 260/29.6 E |
| 3,097,178 | 7/1963 | Townsend et al. | 260/23 EM |
| 3,350,338 | 10/1967 | Savage | 260/29.6 H |
| 3,516,975 | 6/1970 | Meincke | 526/209 |
| 3,575,911 | 4/1971 | Peterson | 260/29.6 E |
| 3,640,935 | 2/1972 | Alriss | 260/29.6 TA |
| 3,736,287 | 5/1973 | Patella | 260/29.6 TA |
| 3,755,225 | 8/1973 | Pierce, Jr. | 260/23 EM |
| 3,790,520 | 2/1974 | Ludwig | 260/29.6 E |
| 3,844,990 | 10/1974 | Lindemann et al. | 260/17 R |

OTHER PUBLICATIONS

"Synthetic Resin Emulsions," H. Warson, p. 166, 1972, Ernest Benn Ltd., London.

Primary Examiner—Eugene C. Rzucidlo
Attorney, Agent, or Firm—P. D. Shepherd

[57] ABSTRACT

Synthetic polymer latexes, particularly acrylic latexes, containing polyoxyhydrocarbylene dihydrocarbyl ethers such as diethylene glycol n-butyl tert-butyl ether as coalescing agents exhibit enhanced film forming characteristics and improved physical properties.

15 Claims, No Drawings

POLYOXYHYDROCARBYLENE DIHYDROCARBYL ETHERS AS COALESCING AGENTS FOR SYNTHETIC POLYMER LATEXES

BACKGROUND OF THE INVENTION

This invention relates to synthetic polymer latexes useful in coating applications wherein the latexes have coalescing agents incorporated therein.

Films made from many synthetic polymer latexes, particularly acrylic and vinyl ester latexes, are known to have excellent physical properties including superior elasticity, resilience, elongation at break, and pigment binding power; and excellent chemical properties, such as resistance to hydrolysis and solvent attack. Because of these properties, latexes of these polymers are used extensively in many interior and exterior coating applications.

Unfortunately, many such latexes having the aforementioned desirable properties are not film forming in many conventional coating applications. In order to overcome this deficiency, it has been a common practice to add a non-volatile organic liquid, such as alkyl phthalate esters and phosphate esters (commonly referred to as plasticizers), to the latex. These plasticizers soften the resin particles thereby promoting their coalescence into a continuous film. However, such plasticizers reduce the freeze-thaw stability of the latex. Moreover, their presence in the films made from the latexes render the films soft and tacky, thereby causing dirt accumulation problems during drying.

In order to overcome these problems, it has become a common practice to add a volatile plasticizer (often referred to as a "transient plasticizer" or fugitive coalescing agent) to the latex. See, for example, *The Applications of Synthetic Resin Emulsions* by H. Warson, published in 1972 by Ernest Benn Limited, London, Chapter III, "General Polymer Emulsion Application".

However, to be effective, the volatile plasticizer must not cause latex destabilization during its addition to the latex (commonly referred to as shock), must maintain a high coalescence efficiency and must not produce odor during evaporation. It has been found that certain compounds, such as aliphatic glycols, aliphatic glycol ethers (U.S. Pat. No. 3,790,520), aromatic glycol ethers and acetate capped glycol ethers are acceptable as fugitive coalescing agents in most coating applications. Common examples of these include ethylene glycol phenyl ether; 2,2,4-trimethyl 1,3-pentanediolmonoisobutyrate; and diethylene glycol n-butyl ether acetate. Unfortunately these plasticizers evaporate slowly, thus increasing drying times and intervals between recoating.

In view of the aforementioned deficiencies, it remains highly desirable to furnish a latex composition which, when applied as a coating, will dry rapidly to form a non-tacky film having the physical properties characteristic of the latex polymer in virgin form.

SUMMARY OF THE INVENTION

Accordingly, this invention is an aqueous coating composition comprising a latex of a normally solid, thermoplastic organic addition polymer and a coalescing amount of a polyoxyhydrocarbylene dihydrocarbyl ether represented by the formula:

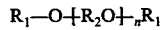

wherein each $R_1$ is independently a hydrocarbyl group having between about 1 and about 8 carbon atoms, each $R_2$ is independently an aliphatic hydrocarbylene group having between about 2 and about 4 carbon atoms and $n$ is a whole number between 1 and about 4.

Surprisingly, the novel latex compositions of the present invention are more stable, less odorous and form a non-tacky film more rapidly than do the latex compositions containing conventional coalescing aids. Furthermore, the latex compositions of this invention are useful in floor polishes, paints, paper coatings, and adhesives.

DETAILED DESCRIPTION OF PREFERRED EMBODIMENTS

For the purposes of this invention, a synthetic polymer latex is a stable aqueous colloidal dispersion of a solid thermoplastic organic addition polymer. Kinds of polymerizable unsaturated monomers, aqueous polymerization media, catalysts, emulsifiers, procedures and means for making latexes are well known in the art, and reference is made thereto for the purposes of this invention. Merely for purposes of illustration and not for limitation, reference is made to *Polymer Processes*, edited by Calvin E. Schildknecht, published in 1956 by Interscience Publishers, Incorporated, New York, Chapter IV; "Polymerizations in Emulsion" by H. Leverne Williams. In Table II on pages 122–133 of Schildknecht are listed diverse kinds of monomers which can be emulsion polymerized alone (homopolymers) or in mixtures (copolymers) to form latexes that are suitably employed in the practice of this invention. Of particular interest in this invention are the latexes of acrylic polymers and polymerized vinyl esters of saturated carboxylic acid. Examples of acrylic polymers include polymerizates of one or more alkyl acrylates such as ethyl acrylate, butyl acrylate, 2-ethylhexyl acrylate, $\beta$-ethoxyethyl acrylate, and other similar alkyl acrylates. Advantageously, from about 20 to about 80 weight percent of one or more of the above alkyl acrylates are copolymerized with from about 80 to about 20 weight percent of a hardening monomer such as a methyl methacrylate, $\beta$-ethoxyethyl methacrylate, styrene or acrylonitrile and from about 0.1 to about 5 weight percent of a polymerizable acid such as acrylic or methacrylic acid. Examples of vinyl esters of carboxylic acid are vinyl acetate and vinyl propionate. Advantageously, from about 90 to about 10 weight percent of a vinyl ester of carboxylic acid is copolymerized with from about 10 to about 90 weight percent of an alkyl acrylate monomer and from about 0.1 to about 5 percent of a polymerizable acid.

The coalescing agent employed herein is represented by the formula:

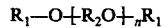

wherein each $R_1$ is independently a hydrocarbyl group having between about 1 and about 8 carbon atoms, each $R_2$ is independently an aliphatic hydrocarbylene group having between about 2 and about 4 carbon atoms and $n$ is a whole number between 1 and about 4. By "hydrocarbyl" is meant any monovalent hydrocarbon group, including alkyl, aryl, and alkylaryl groups. By "aliphatic hydrocarbylene" is meant any divalent aliphatic hydrocarbon group such as alkylene.

Exemplary $R_1$ groups are tert-butyl, n-butyl, ethyl, propyl, pentyl, isopentyl, benzyl, methyl benzyl and ethyl benzyl. Preferably, each $R_1$ is an aliphatic hydrocarbyl group. Exemplary $R_2$ groups are ethylene and propylene. Especially preferred, one $R_1$ is a tert-butyl, the other $R_1$ group is n-butyl, $R_2$ is ethylene, and $n$ is 2 or 3.

The coalescing agent is advantageously prepared by reacting a monoether of a polyhydrocarbylene glycol of the formula:

$$R_1-O+R_2O+_nH$$

$R_1$, $R_2$ and $n$ being hereinbefore defined, with the desired $R_1$ group to be attached in the presence of an acid catalyst. The acid catalyst is advantageously a cation exchange resin or an acid that will provide a hydrogen ion in aqueous solution; i.e., a Lowry-Bronsted acid. The reaction can take place in either a heterogeneous system wherein a cation exchange resin such as sulfonated polystyrene is used as the catalyst or in a homogeneous system where the catalyst is an acid such as sulfuric acid. Reaction conditions depend on the nature of the $R_1$ group to be attached and the specific monoether of a polyhydrocarbylene glycol. Advantageously, reaction conditions are such that they minimize unwanted side reactions and provide maximum yield. As an example, when attaching the preferred t-butyl group, the desired monoether and t-butyl alcohol are fed into a pressurized closed chamber at initial temperatures of between about 50° C. and about 80° C. As the reaction proceeds, the temperature is reduced reaching between about 20° C. to about 25° C. upon completion. Total reaction time is typically between about 1 hour and 5 hours, depending on the initial reaction temperature.

In preferred embodiments, the invention is practiced by adding the coalescing agent in pure form or as a solution of the agent in a water-soluble glycol such as ethylene glycol, propylene glycol or diethylene glycol to the latex. The glycol solution beneficially contains between about 10 and about 50 percent by weight of the coalescing agent, preferably from about 15 to about 35 weight percent. The coalescing agent is preferably added after the usual adjuncts such as thickeners, defoamers, pigments and the like have been blended with the latex to prepare it for coating applications. During the addition of the coalescing agent to the latex or latex/adjunct formulation, it is desirable to agitate the latex or latex/adjunct formulation to achieve a homogeneous blend. After blending, it is advantageous to hold the finished blend at room temperature for at least one day to allow for the absorption of the coalescing agent by the polymer particles. Mixing of the foregoing materials can be readily accomplished with conventional mixing apparatus such as stirrers, pumps, homogenizers, and the like. The temperature of the mixing is not critical and is conveniently at or near room temperature.

Beneficially, the coalescing agent is used in at least a coalescing amount. By coalescing amount is meant that amount that will facilitate the formation of continuous film upon drying a coating of the latex under the drying conditions to be employed, preferably under ambient conditions. The coalescing amount will vary according to latex type, formulation and the specific coalescing agent used. However, in most formulations, a coalescing amount is within the range from about 1 to about 15 parts (dry) by weight of coalescing agent per 100 parts (dry) of latex polymer. Preferably, the coalescing agent used is the minimum amount that will effect coalescence; e.g., minimum coalescing amount, which is usually between from about 1 to about 8 percent (dry) by weight based on dry weight of the latex polymer.

In the preferred practice of the present invention, the aqueous coating composition, contains conventional adjuncts in addition to the latex and coalescing agent. Generally, the adjuncts range from about 100 to about 450 dry weight parts based on 100 dry weight parts of latex. Customary adjuncts to the latex include a thickener, a defoamer, a surface active agent, a catalyst, a pigment, an antimicrobial, and, in many cases, a protective colloid. Generally, these adjuncts are thoroughly blended before their addition to the latex. Selection of the exact adjuncts and the method of blending them with the latex will depend upon the end-use application of the formulation. Neither the adjuncts nor the blending methods are critical in the application of this invention. Preferably such adjuncts are added to the latex prior to the combination of the latex with the coalescing agent. After addition of the usual adjuncts and the coalescing agent, the pH of the solution is adjusted. The resultant coating composition can easily be applied conventionally using a brush, roller or like means, and needs no unusual methods of drying to form the desired film. In a preferred embodiment, the coating composition contains on a dry basis from about 15 to about 90 weight percent of latex polymer solids; about 10 to about 85 dry weight percent of adjuncts and about 0.2 to about 8 dry weight percent of coalescing agent. This dry composition constitutes from between about 25 to about 75 weight percent of the total weight of the aqueous coating composition, with the remainder being liquid, primarily water.

To show the advantages of the aqueous coating composition of the present invention the following examples are presented. These examples should not be construed to limit the scope of the invention. In the examples, all parts and percentages are by weight unless otherwise indicated.

EXAMPLE 1

Several semi-gloss paint formulations containing different coalescing agents as specified in Table I are prepared in the following manner.

The following materials are added to a five gallon Cowles mixer to produce a semi-gloss paint.

|  | Solid Parts | Liquid Parts |
|---|---|---|
| Water } Premixed | — | 135 |
| Methyl Cellulose Thickener | 1.5 | 1.5 |
| Defoamer[1] | 4 | 4 |
| Di-isobutylene-maleic anhydride sodium salt catalyst (25% aqueous solution) | 3 | 12 |
| Propylene glycol | — | 30 |
| Antimicrobial Agent[2] | 1.3 | 1.3 |
| Rutile Titanium Dioxide | 300 | 300 |

[1] Blend of mineral oils and silica derivatives sold as Drew L-475 by the Drew Chemical Company
[2] A hexamethylenetetramine derivative mixed with sodium bicarbonate sold as DOWICIL® 75 by The Dow Chemical Company This mixture is agitated for 20 minutes at a rate of approximately 4500 feet per minute (fpm). Then the mixer is slowed to a rate of 1900 fpm and the following materials are added slowly during agitation:

|  | Solid Parts | Liquid Parts |
|---|---|---|
| Water | — | 25 |
| Methyl Cellulose | 1.5 | 1.5 |

-continued

|  | Solid Parts | Liquid Parts |
|---|---|---|
| Thickener | | |
| Defoamer[3] | 2 | 2 |
| Surfactant[4] | 2 | 2 |
| Ucar Latex 508 (51% aqueous solution; vinyl ester terpolymer latex)[5] | 285.6 | 560 |

[3]Blend of mineral oils and silica derivatives sold as Drew L-475 by the Drew Chemical Company
[4]Dioctyl sodium sulfo succinate sold as Triton[200] GR-7M by Rohm and Haas
[5]A vinyl acetate/alkyl acrylate/acid terpolymer sold by Union Carbide 1900 fpm in the Cowles mixer. After addition, the resulting composition is adjusted to a pH of 8.0 by means of 28 percent aqueous $NH_4OH$.

Films are cast from the latex formulations and tested for coalescing agent evaporation rate, scrubbability, high temperature storage stability, freeze-thaw stability, color acceptance and shock, with the results for evaporation rate, scrubbability and storage stability being reported in Table I and the results for freeze-thaw stability, color acceptance and shock being recorded in Table II.

TABLE I

| | | | | SEMI-GLOSS PAINT | | | | | | |
|---|---|---|---|---|---|---|---|---|---|---|
| Sample No. | Coalescing Agent[1] | | Evaporation Rate,[2]hrs | Scrubbability,[3]cycles | | High Temperature Storage Stability,[4]cps | | | | |
| | Type | Amount % | | 24 hr | 7 day | Initial | 1 Week | 2 Weeks | 3 Weeks | 4 Weeks |
| 1* | None | — | — | 2400 | 2500 | 88 | 89 | 87 | 86 | 84 |
| 2* | EGPE | 3 | >100 | 3300 | 3600 | 86 | 91 | 86 | 86 | 88 |
| 3* | TMPMI | 5 | 52 | 3250 | 3600 | 85 | 88 | 83 | 83 | 88 |
| 4* | DEG-BEA | 3 | 56 | 3100 | 3400 | 86 | 86 | 87 | 89 | 86 |
| 5 | DEG-dBE | 4 | 18 | 3050 | 3400 | 85 | 86 | 87 | 83 | 83 |

*Not an example of this invention
[1]The type of coalescing agent is given in abbreviated denotation. Sample 1 is prepared using no coalescing agent. The coalescing agent used in Sample 2 is ethylene glycol phenol ether (EGPE); 2,2,4-trimethyl 1,3-pentadiol monoisobutyrate (TMPMI) is used as the coalescing agent in Sample 3; diethylene glycol n-butyl ether acetate (DEG-BEA) is used as the coalescing agent in Sample 4. Sample 5 is prepared using diethylene glycol n-butyl t-butyl ether (DEG-dBE) as the coalescing agent. The latex composition of Sample 5 is made in accordance with this invention.
The amount refers to minimum coalescing amount as hereinbefore defined. Minimum coalescing amounts are reported on the basis of the dry weight percent of coalescing agent, based on the total dry latex polymer weight needed to pass a drawdown type test at 39° F ± 1° F. Aged paint samples containing selected levels of the coalescents are placed in a cold room at 39° F ± 1° F and 65 percent relative humidity along with sealed/unsealed drawdown charts (Penopac Form 1B) and the film-forming equipment. Films of 10 mils are then made using standard drawdown equipment. The drawdowns are kept in the cold room for 48 hours before rating for film continuity under 3.5 × magnification. The minimum amount of coalescent added to the latex at which no cracking is observed over the entire Penopac drawdown is taken as the minimum coalescing amount for that coalescent.
[2]Evaporation rates of the compounds are measured by placing one gram of the coalescent on a 15 cm No. 42 Whatman Filter paper hanging vertically in open lab space at 25° C, 25 percent relative humidity. The paper is weighed at selected time intervals to obtain the evaporation rate.
[3]Scrubbability is the resistance to erosion caused by scrubbing. It is evaluated using a modified ASTM D-2486-69T. Modifications to this procedure consist of making two 1" wide, 7 mil drawdowns 1" apart centered on a black plastic (Leneta) chart, perpendicular to the direction of brush travel. The failure point is taken as the minimum number of cycles to completely remove the paint film in one continuous line across the width of each paint sample drawdown. The other change is the substitution of Illinois 1160 silica in the scrub medium for the recommended WC&D #22 silica.
[4]High temperature storage stability is measured by determining the initial Stormer viscosity using a Stormer viscometer equipped with a paddle type rotor at 25° C and 25 percent relative humidity. The latex solution containing the coalescing aids at their minimum coalescing levels are then placed in an oven at 120° F. At one week intervals, the samples are removed from the high temperature oven. These are allowed to sit for four hours at 25° C, 25 percent relative humidity, to obtain equilibrium conditions. After this time, the Stormer viscosity is measured. This procedure is continued for four weeks.

TABLE II

| | | SEMI-GLOSS PAINT | | | | | | | | |
|---|---|---|---|---|---|---|---|---|---|---|
| | | | | | | | | Color Acceptance (6) | | |
| | | Freeze-Thaw Stability,[5]cps | | | | | | Aqua Blak | Phthalo | Violet |
| Sample | Coalescent | Initial | 1 Cycle | 2 Cycle | 3 Cycle | 4 Cycle | 5 Cycle | G | Blue | J | Shock[7] |
| 1* | None | 88 | 86 | 87 | 86 | 86 | 87 | 2 | 2 | 4 | — |
| 2* | EGPE | 86 | 85 | 86 | 86 | 85 | 86 | 2 | 2 | 4 | 4 |
| 3* | TMPMI | 85 | 85 | 84 | 86 | 82 | 85 | 2 | 2 | 4 | 1 |
| 4* | DEG-BEA | 86 | 85 | 87 | 86 | 83 | 83 | 2 | 2 | 4 | 1 |
| 5 | DEG-dBE | 85 | 85 | 88 | 83 | 83 | 83 | 2 | 2 | 4 | 1 |

*Not an example of this invention
[5]The freeze-thaw stability is measured by means of the following procedure. Latex solutions containing the coalescing agents at their minimum effective levels are subjected to five freeze-thaw cycles. The freeze cycle is first and consists of twenty-four hours at 0° F. The thaw cycle immediately follows the freeze cycle and consists of twenty four hours at 77° F. The initial Stormer viscosity, along with the Stormer viscosity after each cycle, is measured. All viscosities are measured after the solution reaches equilibrium in an environment of 25° C and 25 percent relative humidity.
[6]Color acceptance is measured using the following procedure.
Three color concentrates are evaluated:
(a)Aqua Blak G (Citgo)
(b)Phthalo Blue (Tenneco)
(c)Violet J (PPG)
Fifty grams of each paint sample is added to three two-ounce glass bottles and capped. They are then placed in an oven for 2–4 hours at 120° F. The jars are then removed and while still warm, one gram of the desired colorant is added to each jar (for the violet, 2.5 grams is added). The samples are then stirred until the colorant is thoroughly mixed. A 7 mil drawdown is then made on a Penopac sheet. At the edge of the film and sheet, the paint is lightly rubbed in a circular motion until the paint becomes tacky. After the pain film dries, the color differences between the rubbed out section and the remainder of the film are rated against color standards ranging from 1 to 10.
1 = No color difference, no pigment flocculation.
10 = Gross color difference, no apparent hiding due to color, complete pigment flocculation.
[7]Latex destabilization (Shock) during formation is measured by passing the latex to be tested through a 60 mesh screen prior to addition of the coalescing agent to remove large contaminants and large latex particles. The coalescing agent in 0.05 gram increments is added to 50 grams of latex with agitation. Stirring is then continued for one minute. the sample is then screened through a 60 mesh screen to remove any coagulated latex. A rating of 1 to 4 is given depending on the amount of coagulated latex; one being the best rating; four being the worst. A rating of 1 represents no shock; a rating of 2 indicates slight coagulation upon the stirring blade and shaft; a rating of 3 indicates coagulation is sufficient to partially or substantially plug the 60 mesh scrren; and screen; rating of 4 indicates gross coagulation of substantially all the polymer solids.

The resulting mixture is agitated for 20 minutes at approximately 1900 fpm.

A premix of 30 parts propylene glycol and the coalescing agent specified in Table I is prepared. This premix is added to the paint formulation during agitation of As evidenced by the foregoing data of Tables I and II, all the coalescing agents perform equally at their minimum coalescing amounts, with the exception of evaporation rate and latex destabilization (Shock) during formation. Sample No. 5 which is the coating composition illustrating this invention has a desirable shock rating. More importantly, the evaporation rate for the coalescing agent used in Sample 5 is significantly less than the conventional coalescing agents.

EXAMPLE 2

This example is similar to Example 1 except that the latex formulation is an interior flat paint formulation.

The following ingredients are charged to the Cowles mixer at 1900 fpm.

| Materials | Parts Dry Weight | Parts Wet Weight |
|---|---|---|
| Water | — | 420 |
| Methyl Cellulose Thickener } Premixed | 8 | 8 |
| Di-isobutylene-maleic anhydride sodium salt catalyst (25% aqueous solution) | 2 | 2 |
| Defoamer[1] | 2 | 2 |
| Antimicrobial Agent[2] | 1.3 | 1.3 |
| Ethoxylated nonyl phenyl | 5 | 5 |
| Rutile Titanium Dioxide | 250 | 250 |
| Clay Filler | 100 | 100 |
| Fumed Silica Filler | 125 | 125 |

[1]Sold as Nopco NDW by the Nopco Chemical Company
[2]A hexamethylene tetramine derivative mixed with sodium bicarbonate, sold as DOWICIL ® 75 by The Dow Chemical Company This mixture is agitated for 20 minutes at a rate of about 4500 fpm. After 20 minutes, the mixer is slowed to 1900 fpm and 250 parts (wet weight) of latex are added. The latex used is UCAR 508 sold by Union Carbide; a vinyl ester terpolymer of vinyl acetate/alkyl acrylate/acid at 51 percent solids. This mixture is then agitated for 20 minutes at 1900 fpm. Again, a pre-blend of propylene glycol (25 parts) and the coalescing agent as specified in Table III is added to the above formulation during agitation at a rate of 1900 fpm. After pre-blend addition, the pH is adjusted to 8.0 with 28 percent NH$_4$OH.

Films are cast from the latex formulations and tested for coalescing agent evaporation rate, scrubbability and shock, with the results being recorded in Table III.

TABLE III

FLAT LATEX

| Sample No. | Coalescent[1] Type | Coalescent[1] Amount % | Evaporation Rate,[2] hrs | Scrubbability,[3] cycles 24 hr | Scrubbability,[3] cycles 7 day | Shock[4] |
|---|---|---|---|---|---|---|
| 6* | None | — | — | 260 | 340 | — |
| 7* | EGPE | 5 | >100 | 500 | 530 | 4 |
| 8* | TMPMI | 7.5 | 52 | 280 | 520 | 1 |
| 9* | DEG-BEA | 5.5 | 56 | 560 | 590 | 1 |
| 10 | DEG-dBE | 6.5 | 18 | 600 | 570 | 1 |

*Not an example of this invention
[1]Abbreviations are same as (1) in Table I and Amount same as (1) in Table I.
[2]Same as (2) in Table I.
[3]Same as (3) in Table I.
[4]Same as (7) in Table I.

A comparison of the shock values of the coating compositions containing the four different coalescing agents shows that the coating composition of this invention (Sample No. 10) has an excellent shock value. More importantly, Sample No. 10 shows slightly improved scrub resistance due in part to the higher evaporation rate of the coalescing agent providing more rapid development of a paint film scrub resistance.

EXAMPLE 3

To illustrate the shock and evaporation rate of coating compositions that exemplify this invention, coating compositions are prepared using diethylene glycol di-tert-butyl ether, dipropylene glycol di-tert-butyl ether, and diethylene glycol ethyl tert-butyl ether as coalescing agents in one of the two following latexes; Union Carbide UCAR 360 (Latex No. 1), a vinyl ester terpolymer of vinyl acetate/alkyl acrylate/acid having 55 percent solids and DeSoto 88-070 (Latex No. 2), an acrylic latex of alkyl acrylate/hardening monomer/acid terpolymer with approximately 50 percent solids. The coalescing agents are added as pure materials to the latex at their minimum coalescing amount. No other adjuncts are present in the latexes.

Shock and evaporation rates of these materials are presented in Table IV. As shown in Table IV, the shock values of the coating compositions are excellent. Moreover, the evaporation rates of the coalescing agents are all significantly less than the evaporation rates of the coalescing agents conventionally used (as shown in Table I).

TABLE IV

| Coalescing Agent[1] | Evaporation Rate (2), hrs | Latex No. 1 Coalescing Amount[3] | Latex No. 1 Shock (4) | Latex No. 2 Coalescing Amount | Latex No. 2 Shock |
|---|---|---|---|---|---|
| DEG (tBE)$_2$ | 11 | 4.0 | 1 | 8.0 | 1 |
| DPG (tBE)$_2$ | 14 | 6.6 | 1 | 9.0 | 1 |
| DE-tBE | 5 | 6.6 | 1 | 9.0 | 1 |

(1)DEG(tBE)$_2$ - diethylene-glycol di-tert-butyl ether; DPG(tBE)$_2$ - dipropylene glycol di-tert-butyl ether; DE-tBE - diethylene glycol ethyl tert-butyl ether
(2)Same as (2) in Table I
(3)Coalescing amount refers to minimum coalescing amount defined in (1) of Table I.
(4)Same as 7 in Table II

What is claimed is:

1. An aqueous coating composition comprising a latex of a normally solid thermoplastic organic addition polymer and a coalescing amount of a polyoxyhydrocarbylene dihydrocarbyl ether represented by the formula:

$$R_1-O+R_2O+_nR_1$$

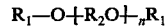

wherein each $R_1$ is independently a hydrocarbyl group having between about 1 and about 8 carbon atoms, each $R_2$ is individually an aliphatic hydrocarbylene having between about 2 and about 4 carbon atoms and $n$ is a whole number from 1 to about 4.

2. The composition of claim 1 wherein the $R_1$ groups are alkyl groups of between 2 and 6 carbon atoms.

3. The composition of claim 1 wherein each $R_2$ group is independently ethylene or propylene.

4. The composition of claim 1 wherein the $R_1$ groups are alkyl groups of between 2 to 6 carbon atoms and each $R_2$ group is independently ethylene or propylene.

5. The composition of claim 4 wherein one of the $R_1$ groups is a tert-butyl.

6. The composition of claim 5 wherein the other $R_1$ group is an alkyl group of between 2 and 6 carbon atoms.

7. The composition of claim 5 wherein the other $R_1$ group is a benzyl, $R_2$ is ethylene and $n$ is 1.

8. The composition of claim 5 wherein the other $R_1$ group is tert-butyl.

9. The composition of claim 5 wherein each $R_2$ group is independently ethylene or propylene.

10. The composition of claim 6 wherein each $R_2$ group is independently ethylene or propylene and $n$ is 2.

11. The composition of claim 1 wherein the aqueous coating composition comprises from about 0.2 to about 8 dry weight percent of the polyhydrocarbylene dihydrocarbyl ether.

12. The composition of claim 1 wherein the organic addition polymer is an acrylic polymer.

13. The composition of claim 1 wherein the organic addition polymer comprises from about 20 to about 80 weight percent of an alkyl acrylate, from about 80 to about 20 weight percent of a hardening monomer, and from about 0.1 to about 5 weight percent of a polymerizable acid.

14. The composition of claim 1 wherein the organic addition polymer is a polymerizate of a vinyl ester of a saturated carboxylic acid.

15. The composition of claim 1 wherein the organic addition polymer comprises from about 10 to about 90 weight percent of an alkyl acrylate, from about 90 to about 10 weight percent of a vinyl ester of a saturated carboxylic acid and from about 0.1 to about 5 weight percent of a polymerizable acid.

* * * * *